United States Patent
Fijolek et al.

(10) Patent No.: US 7,340,047 B2
(45) Date of Patent: Mar. 4, 2008

(54) METHOD FOR REMOTE SERVICE FORWARDING (RSF) BETWEEN DISSIMILAR SYSTEMS WITH OPERATOR, SERVICE AND LOCATION PORTABILITY

(75) Inventors: John Fijolek, Rolling Meadows, IL (US); Guanglu Wang, Buffalo Grove, IL (US)

(73) Assignee: UTStarcom, Incorporated, Alameda, CA (US)

( * ) Notice: Subject to any disclaimer, the term of this patent is extended or adjusted under 35 U.S.C. 154(b) by 142 days.

(21) Appl. No.: 11/005,534

(22) Filed: Dec. 6, 2004

(65) Prior Publication Data

US 2005/0243991 A1    Nov. 3, 2005

Related U.S. Application Data

(60) Provisional application No. 60/527,361, filed on Dec. 5, 2003.

(51) Int. Cl.
*H04M 7/00*    (2006.01)

(52) U.S. Cl. .............................. 379/211.02; 379/220.02

(58) Field of Classification Search ........... 379/211.02, 379/220.02
See application file for complete search history.

(56) References Cited

U.S. PATENT DOCUMENTS

| 6,078,581 | A | * | 6/2000 | Shtivelman et al. | 370/352 |
| 6,571,094 | B1 | | 5/2003 | Begeja et al. | 455/417 |
| 7,099,944 | B1 | * | 8/2006 | Anschutz et al. | 709/227 |

OTHER PUBLICATIONS

International Search Report for PCT/US04/40828 dated Jun. 12, 2004.

* cited by examiner

*Primary Examiner*—Quynh H. Nguyen

(57) ABSTRACT

A remote service forwarding (RSF) system allows the telephone service user to access the subscribed services via different access devices without the loss of service. The system allows a user to access different systems or uses dissimilar phone devices or different service providers by porting services over an IP connection. The user may access subscribed services such as Centrex or PBX services over a mobile IP connection.

20 Claims, 3 Drawing Sheets

METHOD FOR REMOTE SERVICE FORWARDING (RSF) BETWEEN DISSIMILAR SYSTEMS WITH OPERATOR, SERVICE AND LOCATION PORTABILITY

This application claims the priority of U.S. Provisional Patent Application No. 60/527,361 filed Dec. 5, 2003, the specification of which is incorporated herein by reference.

BACKGROUND

The invention relates to digital telephony. More particularly, the invention relates to mobile switching centers, IP telephony, hosted PBX, and enterprise PHS networks.

In one known solution of remote call forwarding (RCF), a customer calls a telephone number that, unknown to the caller, has been forwarded to a new location. The customer's originating local exchange parks the call while it initiates a signaling message to the apparent terminating local exchange. When the signaling message arrives at the original terminating local exchange via the CCS7 network, the switch polls the customer line to determine its status (e.g., whether the customer line is available, busy, or forwarded). If the line has been forwarded, a look-up table is consulted to determine the new location of the number, and a new signaling path is established. To establish a new signaling path, another signaling message is sent to the new apparent terminating local exchange, and the process is repeated until the correct terminating customer line has been identified. If that line is available, the switch returns a message to the originating exchange to indicate that all is ready for call completion. The call is then released by the originating switch and is routed along the same path as that previously traversed on the signaling network.

Problems with this on-switch solution of remote call forwarding include the limitation of the service to a single system. Moreover, the call path (or at least the signaling path) must be completed before a ported number is recognized. This results in inefficient cal routing, which for large volumes of ported numbers can become unacceptable.

In another solution, known as off-switch, switches involved earlier in the call set-up phase are allowed to access information about ported numbers. In this solution, a customer calls a telephone number that may or may not have been ported to a new location. The customer's originating local exchange (known in the IN architecture as the Service Switching Point, or SSP) parks the call while it initiates a CCS7 signaling message to the IN database at the Service Control Point, SCP. When the signaling message arrives at the SCP, the database is consulted to determine the network address or routing number associated with the dialed telephone number. The SCP returns the routing information to the SSP. The SSP then transmits a signaling message to the terminating exchange to determine whether the called party is available. The call is released by the SSP, and the call path is established over the optimal route to the terminating local exchange.

With such off-switch solutions, there is no equivalent to the terminating database solution for non-geographic services. Moreover, they do not provide a method for linking the services of a user who is subscribed to multiple service providers onto one device, application, or location.

Prior solutions also suffer the disadvantage of an assumption of quality circuit connections that do not exist in ad hoc Internet connections. Instead, quality of service is assumed to the endpoint.

Various IP telephony solutions are known in the art. For example, White et al., U.S. Pat. No. 6,069,809, teaches telephone type services over the Internet. White et al., U.S. Pat. No. 6,021,126, teaches using the Internet for telecommunications number portability. White and Ferris, U.S. Pat. No. 6,014,379 teaches telecommunications custom calling services over the Internet. Kalmanek, et al., U.S. Pat. No. 6,324,279, teaches signaling to link two dissimilar systems for IP telephony. All of these disclosures are incorporated herein by reference. These solutions, however, do not provide a method for linking services of a user subscribed to multiple service providers onto one device.

SUMMARY

A remote service forwarding (RSF) system allows the telephone service user to access the subscribed services via different access devices without the loss or change of service, even where the user accesses different systems or uses dissimilar phone devices or different service providers.

In the operation of the remote service forwarding system a first exporting service provider receives a call to a telephone number. The system determines whether the call is to be forwarded and, if so, identifies an internet protocol (IP) address associated with that telephone number, and it forwards the call to that IP address.

The system is capable of forwarding calls from multiple, dissimilar systems to a single user device. As a result, the system may receive a second call, to a different phone number, at a different exporting service provider. The system may nevertheless identify the same IP address for forwarding of that call to the same user.

The system does not only allow forwarding of calls to a user's IP devices from an exporting service provider to an importing service provider. It also permits a user to access services offered by the exporting service provider, including such services as outgoing telephone calls and voicemail.

DETAILED DESCRIPTION

Figure 1:
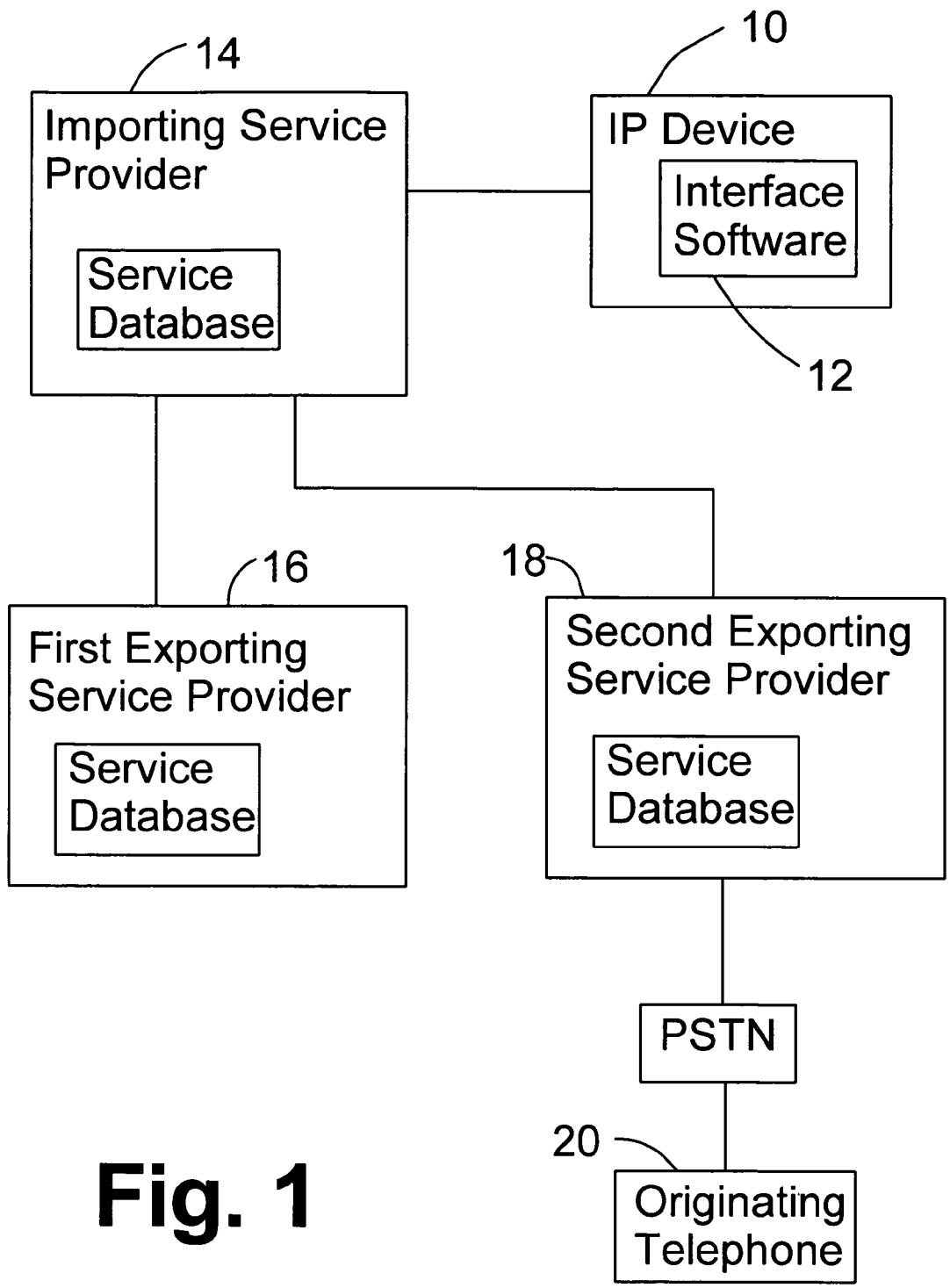
FIG. 1 is a schematic block diagram illustrating the connections between service providers and user devices.

I. Overview of a Remote Service Forwarding System

A remote service forwarding (RSF) system allows the telephone service user to access the subscribed services via different access devices without the loss or change of service, even where the user accesses different systems or uses dissimilar phone devices or different service providers.

One example is the PBX or Centrex service extension. The user can use his regular hardware phone at his desk, he can use a Wi-Fi (or PHS) enabled wireless IP phone when moving around the workplace, or he can use a normal mobile phone (such as a GSM, CDMD or PHS phone) when away from the workplace. The RSF system allows the services that are offered to the PBX user to be delivered to these dissimilar devices when the user is using them.

In another example, when the user is away from the domain of the home service provider, he can still manage to access services with an IP device. The IP device may be, for example, an application running on a personal computer (PC) that has an IP connection. The application includes a graphical user interface that mimics the interface of a phone device with phone buttons. This application registers the user with the home service provider (such as Verizon) via the access service provider (such as Comcast) to request that the normal wireless service be delivered to the application until the registration is canceled.

The system converges services from disjoint operators' office phones and mobile phones into a single converged representation (such as a converged mailbox) within an IP application or IP device. The system may also use drop-back to a mobile or fixed corporate wired call, as described herein, to be utilized when a converged IP application fails to connect. This drop-back is implemented in such a way that lifeline services are satisfied or are enhanced enough to be effectively bypassed.

The system provides a means for wireless operators and private corporate communications to port telephone numbers and convert certain subscriber calls into voice over IP (VoIP) such that the call is forwarded to or from a user-stipulated URL. The URL may be associated with a speakerphone application on a PC or other IP device for a user. This device may act as a substitute endpoint for temporarily and seamlessly originating or terminating calls and services in place of the original endpoint.

This service can be created in a VoIP telephony network using remote call forwarding in which the call-path to ported numbers is established via the exporting non-geographic service provider's switch. The exporting service provider uses its service database to identify the importing service provider via an IP address or URL and the call is then converted to IP and forwarded to that service provider's softswitch. Alternatively, the call is not converted and is forwarded to an associated media gateway. With drop-back, in which the signaling path to ported numbers is established via the exporting non-geographic service provider's switch, the call-path can be established from both within the network of the originating operator's network and within the forwarded network for redundancy.

For example, prior to a call, a broadband service provider (BSP), such as Comcast, registers a user IP address or URL associated with a mobile user's phone number. A mobile service provider (MSP) such as Verizon, provides IP access to subscriber voice mail to the BSP. On stimulus provided by the MSP subscriber, a database entry to either remote call forward (RCF) or to fork calls to a media gateway is recorded. An incoming call to the MSP triggers a database inquiry to the MSP database to determine whether a number has been ported. The RCF triggers forwarding to a media gateway and URL that is geographically associated with either the MSP or BSP. The MSP or BSP sends the call to the user's IP device. A fork triggers a call flow that engages both the RCF described above and a drop-back connection through the mobile switching center.

In the forking case, rules may be established on how drop-back is policed. The rules may be based on, for example, whether a port is available or whether the user answers a ring at either phone device.

On an outgoing call from an IP device on a BSP ported from an MSP, user stimulus (such as the push of a button) may initiate a simple call in which only handshake (accounting) information is shared between SPs, as indicated in the BSP subscriber database. Alternatively, the user stimulus may initiate complex inquiries into the MSP database for voice mail or other transactions appropriate to the MSP service package to be converted to packets for the IP.

Similarly, a BSP can register a CCP user, or, conversely, an MSP can register a BSP or CCP user as a lifeline substitute.

The following illustrated some of the entity relations that may be discovered and maintained in a remote service forwarding system. FIG. 1 illustrates the data relationships used to provision and manage the remote service forwarding system. A subscriber provides telephone number portability information that needs to be mapped to one or more service profiles, products, and profile families. These profiles contain information on the desired endpoint personalities as well as their associated features and policies used to operationally supply the quality of service or lifeline attributes for the session. These, in turn, may map to an application manager (e.g., a SIP feature server) database and/or policy management system.

On activation, the subscriber passes location information and identifies the service provider and profile to be invoked on an incoming call. This information is mapped to operational order and client databases to issue the service and accounting information and also optionally invokes certain quality of service policy interfaces and/or behaviors of the session protocols between the application manager and the RSF endpoint.

A network service and network topology discovery is used to address issues like VPIM interfaces for unified mail services and Access Router type for quality of service purposes.

A seed device, such as a phone or Web browser, could populate the elements as described below.

Using an auto-provisioning model, a customer may access a login-protected site via an end device in the remote services area. The contacted server can run a seed device program through a browser CGI, Java, or other techniques (such as a downloaded client or embedded client routines). This discovery is composed of discovering local LAN information and discovering local site network topology.

To discover local site LAN information, collect and send subnet discovery mechanisms are provided, such as Ping, ARP-a, Windows Registry LOCAL Machine queries, etc.

To discover local site network topology, traceroute-like mechanism reports are created from the customer premises toward the RSF policy management element to discover IP addresses of the first several routing network elements on an outbound packets path (e.g. Traceroute-d RSFserver). These reports are collected and sent. A reverse DNS lookup may be conducted on selected IP addresses of candidate access routing elements (such as the first 1-3 elements discovered) and candidate infrastructure routers that may also have optional control by the policy server(s). A database of domains may be discovered to find routing and aggregation devices within the control or service agreement sphere of the policy management element associated with the RSF function, their functions and access-types (e.g., CMTS Cable Router, DSL, DSLAM, Dial RAS, unknown/best effort).

Call flow scripts are created for the session/policy. The construction of the proper quality of service policy messages and interface for this particular client-type on this particular access-type (e.g. CMTS DQoS policies, DSLAM ATM virtual circuit provisioning, IntServe/DiffServ MPLS, RSVP Proxy target routines/settings, etc.). Scripting of access methods with required policy interfaces is provided as required for the RSF media discovered.

In one example, the PacketCable Multimedia Architecture shows methods of invoking various policy elements for distributed QoS proxy from a policy manager at the request of an application manager. This is an example of an embodiment of policies discovered by the methods defined above for the remote service forwarding system.

Following is an application management interface (an example SIP header) shown as an example of an embodiment on the option of performing application (SIP) endpoint feature programming of an end device using methods defined above for remote service forwarding.

The protocol between the SIP proxy and the RSF endpoint may use a new SIP header, for example, called X-multimedia-service-enabled. This header can be added to messages from the SIP proxy (network core device) to the SIP phone (the end device). This header indicates what and how multimedia service should be provided. The information can be sent to the end point at the time of registration or call setup.

EXAMPLE 1

---

200 OK
. . .
CSeq: 1 REGISTER
. . .
X-multimedia-service-enabled: CW=yes, CCW=yes, CND=no, DVC=WD6035, SP=SPT

---

Example 1 is a message sent from the SIP proxy (acting as a registrar) to inform that this account has only subscribed to call waiting (CW) and cancel call waiting (CCW) services and not subscribed to the service of caller number delivery (CND). The device to emulate is a Kyocera 6035 phone (DVC=WD6035), and services should follow Sprint usage (SP=SPT). After receiving this header in the "200 OK" to the REGISTER message, the SIP phone should stop presenting the calling number to the user through the whole registration lifespan even though the phone has such capability built in. The client device would use a Sprint Kyocera 6035 device with buttons mapped as this phone personality would use them for Sprint-flavored features.

EXAMPLE 2

---

INVITE customer@x.com SIP/2.0
. . .
X-multimedia-service-enabled: CW=no, DVC=SEI202, SP=VRZN

---

Example 2 illustrates a header that can be sent to the end point on a per call basis when it appears in the INVITE message or the responses to the INVITE message. The message is sent from the SIP proxy to the callee end device. The header indicates that, for this incoming call, call-waiting service should not be provided even if the user subscribes to the service. This is useful when the caller does not want his call to be waited. After receiving this header in the incoming INVITE message, the SIP phone should treat the incoming call as if the callee does not have call-waiting capability. It also says that the end device mapping should be that of a Siemens SNO202 SIP phone that the user's profile says is present at the callee site, and that services should be mapped to work like Verizon features.

II. An Exemplary Remote Service Forwarding System

As illustrated in FIG. 1, a user accesses features of the remote service forwarding system through an IP (internet protocol) device 10. IP device 10 may be, for example, a Wi-Fi (or PHS) enabled wireless IP phone or a personal computer (PC) that has an IP connection. The IP device 10 includes interface software 12. The interface software may be, for example, a graphical user interface application on a user's PC. In this case, the interface software preferably has a graphical interface that mimics the interface of a phone device with phone buttons, and it may imitate the appearance of, for example, the PBX or Centrex telephone equipment at the user's office. In this way, the user need not re-learn the operation of the telephone for use on different devices.

As illustrated in FIG. 1, the user may be a subscriber of multiple service providers (the "exporting service providers" 16 and 18), but, with remote service forwarding, he may access the services offered by those service providers through a single importing service provider 14.

For example, if the user has arranged for remote call forwarding from the second exporting service provider 18, telephone calls from an originating telephone 20 can be forwarded to the user via the importing service provider 14, as follows. The originating telephone dials a telephone number that corresponds to the user's telephone number on the second exporting service provider 18. For example, where the second exporting service provider 18 is a mobile service provider, the user's telephone number on that service provider is the number of his mobile phone. The call may originate from over the public switched telephone network.

On receiving the call from the originating telephone, the second exporting service provider 18 queries a service database 24 for information associated with the called telephone number. The service database 24 associates telephone numbers with IP addresses and/or URLs. If the results of the query indicate that calls to the called telephone number are being forwarded to another service provider, the second exporting service provider 18 retrieves an IP address associated with the called telephone number. The IP address may be geographically associated with either the exporting or the importing service provider. The forwarded call is sent to the importing service provider 14. The importing service provider 14, which may be, for example, a broadband service provider, sends the call to the user's IP device 10.

The first exporting service provider 16 operates similarly to the second exporting service provider. Like service provider 18, service provider 16 includes its own service database 26, which associates users' telephone numbers with IP addresses and/or URLs. The first exporting service provider 16 may be, for example, a PBX or Centrex system implemented at the user's office.

A single user's telephone number is different for different service providers. For example, the user's office number (on the first service provider) is different from the user's mobile telephone number (on the second service provider). Nevertheless, according to the system described herein, calls to the user through different service providers may be directed to the same IP device 10. The IP device 10 may distinguish calls arriving through different service providers by, for example, using distinctive ring sounds for callers over different networks. Likewise, the interface software 12 may emulate a different telephone for calls arriving through different service providers.

In addition to being able to receive telephone calls forwarded from different service providers, a user of the present system may make outgoing calls and/or access services provided on different networks. To do so, the user initiates an outgoing call on the IP device 10 by dialing a telephone number or entering a "*" command. The IP device 10 contacts the importing service provider 14 with the information entered by the user, and the importing service provider 14 consults a service database 28 of its own to identify information needed to establish communications with one of the exporting service providers. The user of the IP device 10 may then conduct outgoing calls through one of the exporting service providers, or may employ other services of those providers, such as checking or handling voice mail messages stored by those service providers.

III. An Exemplary Remote Service Forwarding Method

Figure 2:
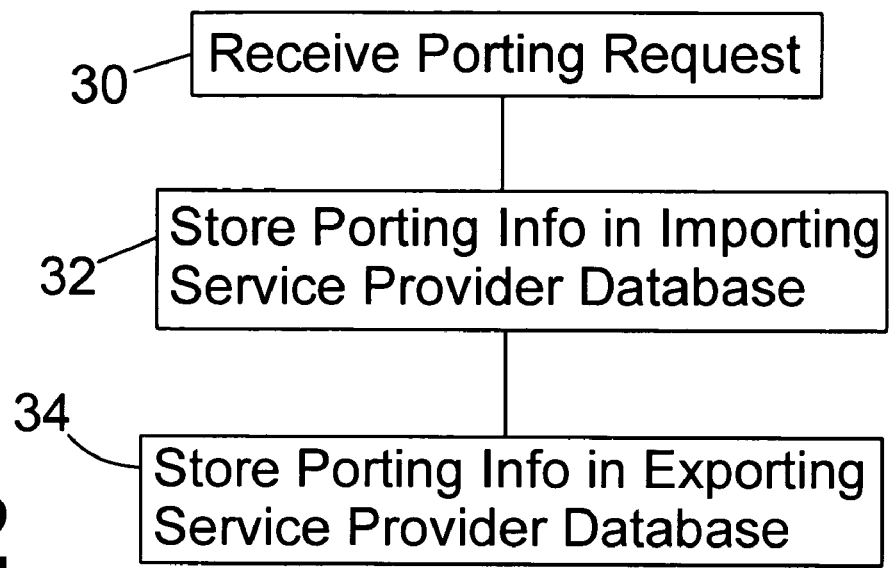
FIG. 2 is a schematic flow diagram illustrating service setup in a remote service forwarding system.
Figure 3:
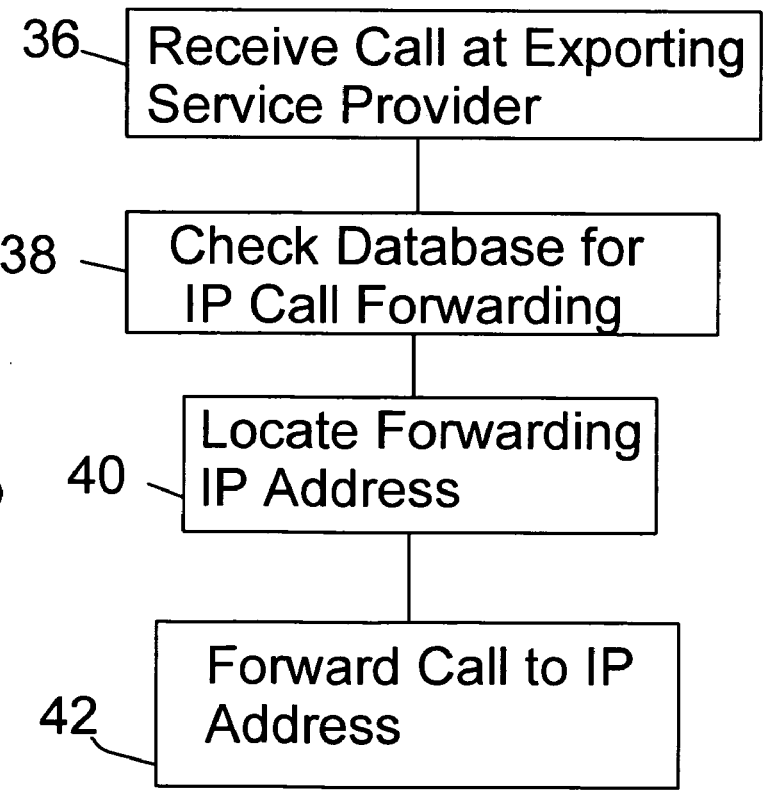
FIG. 3 is a schematic flow diagram illustrating incoming call handling in a remote service forwarding system.
Figure 4:
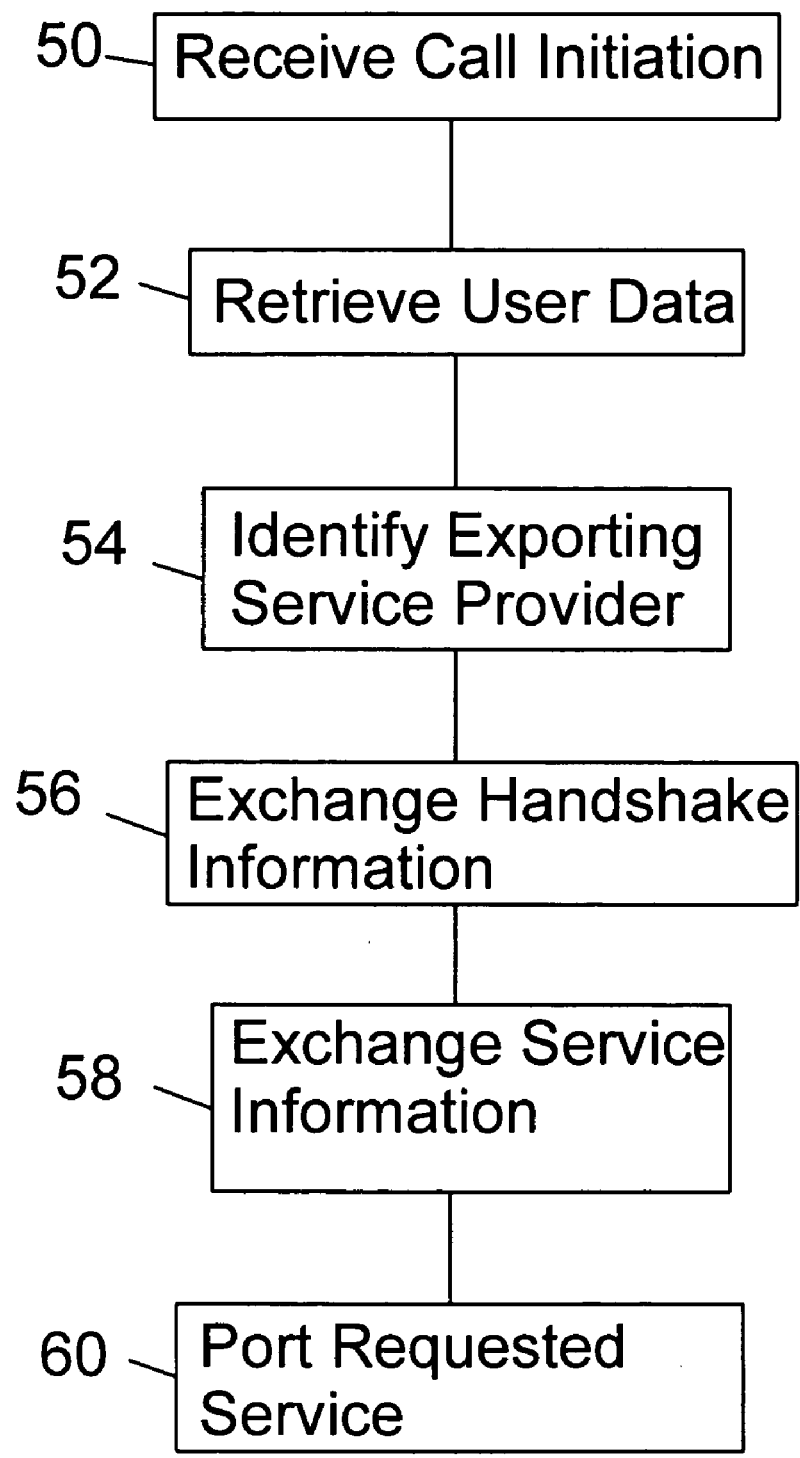
FIG. 4 is a schematic flow diagram illustrating outgoing call handling in a remote service forwarding system.

A method of operating the remote forwarding system is illustrated in FIGS. 2-4. FIG. 2 illustrates steps involved in setting up service forwarding. In particular, in response to a user request at step 30, the system stores porting information in databases associated with both the importing service provider (at step 32) and the exporting service provider (at step 34). In this way, not only can calls to the exporting service provider be forwarded to the user on the importing service provider, but the user at the importing service provider can access services offered by the exporting service provider. Where there is more than one exporting service provider, the porting information at the importing service provider may identify the different exporting service providers.

The process of forwarding an incoming call is illustrated in FIG. 3. A call is received at an exporting service provider in step 36. The exporting service provider then checks in step 38 to determine if a call is to be forwarded. If not, the call is handled normally, otherwise, the exporting service provider locates in step 40 an IP address and/or URL to which the call is to be forwarded, and in step 42, the call is forwarded to that IP address.

The process of accessing a service on an exporting service provider, using an IP device on the importing service provider, is illustrated in FIG. 4. At step 50, the user initiates a call, and the call initiation is received by the importing service provider. At step 52, the service provider retrieves user information, which can include information identifying various exporting service providers subscribed to by the user. At step 54, the importing service provider identifies the exporting service provider that will be used for the call at hand. For example, where the user has arranged multiple exporting service providers, the system may determine which service provider is used for outgoing voice calls, or which system responds to "*" commands. Once it has retrieved the necessary data and identifies the exporting service provider, the importing service provider exchanges handshake information with the exporting service provider at step 56. This information may include accounting information. If any additional information is needed for the importing service provider to access services, such as voicemail, that are offered by the exporting service provider, that information may be exchanged in step 58. After it has received the necessary information, the importing service provider in step 60 ports the service to the user over an IP network. For example, where the importing service provider is a broadband service provider and the exporting service provider is a mobile telephone service provider, the user may access the voicemail of his mobile telephone over an IP network, from a PC, for example.

Although this specification sets forth particular examples and embodiments intended to illuminate different implementations of the invention, these should not be understood to limit the invention, the practice of which includes variations of those systems and methods described herein. Rather, the scope of the invention is defined by the several following claims.

The invention claimed is:

1. A method for providing remote service forwarding comprising:
   providing an application on an IP device, where the application is operative to emulate a plurality of different telephone devices, and the IP device has a network address;
   registering the application with a first home service provider, wherein the registering includes sending the network address to the first home service provider, and wherein the first home service provider associates the network address with a first telephone number;
   registering the application with a second home service provider, wherein the registering includes sending the network address to the second home service provider, and wherein the second home service provider associates the network address with a second telephone number;
   sending, from the first home service provider to the application, emulation information identifying a selected first one of the different telephone devices for emulation;
   sending, from the second home service provider to the user access application, emulation information identifying a selected second one of the different telephone devices for emulation;
   receiving, at the first home service provider, a first call to the first telephone number;
   forwarding the first call to the network address; and
   operating the application to emulate the first selected telephone device during the first call
   receiving, at the second home service provider, a second call to the second telephone number;
   forwarding the second call to the network address; and
   operating the application to emulate the second selected telephone device during the second call.

2. A method as described in claim 1, wherein the emulation information is sent in a SIP message.

3. A method as described in claim 1, wherein the emulation information is sent in response to the step of registering.

4. A method as described in claim 1, wherein the emulation information is sent in response to the step of receiving the first call.

5. A method as described in claim 1, wherein the network address is a URL.

6. A method as described in claim 1, wherein the IP device is a mobile telephone.

7. A method as described in claim 1, wherein the first home service provider is a PBX exchange.

8. A method for providing remote service forwarding comprising:
   providing an application on an IP device, wherein the IP device has a network address;
   registering the application with at least two different home service providers, wherein registering includes sending the network address to each home service provider;
   receiving, at the IP device, a telephone call forwarded from one of the home service providers;
   determining, at the device, which home service provider is forwarding the call; and
   depending on the home service provider issuing the call, issuing from the IP device a ring sound distinctive of the home service provider forwarding the call.

9. A method as described in claim 8, wherein the application is operative to emulate a plurality of different telephone devices, further comprising:

receiving, at the IP device, emulation information identifying a selected first one of the different telephone devices for emulation during calls forwarded by the first home service provider;

receiving, at the IP device, emulation information identifying a selected second one of the different telephone devices for emulation during calls forwarded by the second home service provider;

determining, at the IP device, which home service provider is forwarding the call; and depending on the home service provider forwarding the call, operating the application to emulate the selected telephone device during the call.

10. A method as described in claim 8, wherein the IP device is a mobile telephone.

11. A method as described in claim 8, wherein the IP device is a wireless IP telephone.

12. A method as described in claim 8, wherein at least one of the home service providers is a PBX exchange.

13. A method for providing remote service forwarding comprising:

providing an application on an IP device, where the application is operative to emulate a plurality of different telephone devices, and the IP device has a network address;

registering the application with at least a first home service provider and a second home service provider different from the first home service provider, wherein the registering includes sending the network address to each of the home service providers, and wherein the first home service provider associates the network address with a first telephone number and the second home service provider associates the network address with a second telephone number different from the first telephone number;

receiving, at the IP device, a first call to the first telephone number forwarded by the first home service provider, and operating the application to emulate a first telephone device during the first call; and receiving, at the IP device, a second call to the second telephone number forwarded by the second home service provider, and operating the application to emulate a second telephone device during the second call.

14. A method according to claim 13, wherein the first telephone device and the second telephone device are the same.

15. A method according to claim 13, wherein the first telephone device and the second telephone device are different.

16. A method as described in claim 13, wherein the network address is a URL.

17. A method as described in claim 13, further comprising:

receiving, at the IP device, emulation information identifying a selected first one of the different telephone devices for emulation during calls forwarded by the first home service provider; and receiving, at the IP device, emulation information identifying a selected second one of the different telephone devices for emulation during calls forwarded by the second home service provider.

18. A method as described in claim 13, wherein at least one of the home service providers is a PBX exchange.

19. A method as described in claim 13, wherein the IP device is a mobile telephone.

20. A method as described in claim 13, wherein the IP device is a wireless IP telephone.

\* \* \* \* \*